United States Patent
Li et al.

(10) Patent No.: US 11,350,447 B2
(45) Date of Patent: May 31, 2022

(54) METHOD AND APPARATUS FOR OPERATIONS IN DIFFERENT FREQUENCY BANDS WITHIN A RADIO DEVICE

(71) Applicant: Telefonaktiebolaget LM Ericsson (publ), Stockholm (SE)

(72) Inventors: Ming Li, Beijing (CN); Gen Li, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 74 days.

(21) Appl. No.: 16/339,491

(22) PCT Filed: Aug. 9, 2018

(86) PCT No.: PCT/CN2018/099553
§ 371 (c)(1),
(2) Date: Apr. 4, 2019

(87) PCT Pub. No.: WO2020/029158
PCT Pub. Date: Feb. 13, 2020

(65) Prior Publication Data
US 2020/0267758 A1 Aug. 20, 2020

(51) Int. Cl.
*H04W 74/04* (2009.01)
*H04W 24/02* (2009.01)
(Continued)

(52) U.S. Cl.
CPC ........... *H04W 74/04* (2013.01); *H04W 24/02* (2013.01); *H04W 16/14* (2013.01); *H04W 24/08* (2013.01)

(58) Field of Classification Search
CPC ... H04W 28/04; H04W 72/04; H04W 72/042; H04W 88/08; H04W 74/04; H04W 24/02; H04W 24/08; H04L 5/0007
(Continued)

(56) References Cited

U.S. PATENT DOCUMENTS 8,526,388 B1 * 9/2013 Kaukovuori ........ H04W 72/082
370/329
9,369,992 B1 * 6/2016 Park .................. H04W 72/0453
(Continued)

FOREIGN PATENT DOCUMENTS

CN        10500311 A * 8/2009 ............ H04W 72/00
CN       105099612 A * 11/2015 ............... H04L 1/00
(Continued)

OTHER PUBLICATIONS

International Search Report and Written Opinion for International Patent Application No. PCT/CN2018/099553, dated Apr. 2, 2019, 8 pages.
(Continued)

*Primary Examiner* — Peter G Solinsky
*Assistant Examiner* — Sanjay K Dewan
(74) *Attorney, Agent, or Firm* — Christopher & Weisberg, P.A.

(57) ABSTRACT

Various embodiments of the present disclosure provide a method for configuring a radio device which is operable in a first carrier and a second carrier. The method comprises determining whether the operation in the first carrier is to interfere with the operation in the second carrier. The method further comprises arranging the operation in at least one of the first carrier and the second carrier based at least in part on the determination. According to the embodiments of the present disclosure, the operations of the radio device in different frequency bands can be arranged adaptively and flexibly, so that system capacity and energy efficiency can be improved.

20 Claims, 14 Drawing Sheets

(51) Int. Cl.
*H04W 16/14* (2009.01)
*H04W 24/08* (2009.01)

(58) Field of Classification Search
USPC .......................................................... 370/329
See application file for complete search history.

(56) References Cited

U.S. PATENT DOCUMENTS

| | | | |
|---|---|---|---|
| 9,473,286 B1* | 10/2016 | Shipley | H04L 5/001 |
| 9,585,099 B1* | 2/2017 | Manchanda | H04W 36/0094 |
| 2012/0094614 A1* | 4/2012 | Komori | H04B 1/109 |
| | | | 455/73 |
| 2012/0129558 A1* | 5/2012 | Bi | H04J 11/0023 |
| | | | 455/501 |
| 2013/0044621 A1* | 2/2013 | Jung | H04L 5/0007 |
| | | | 370/252 |
| 2016/0285505 A1* | 9/2016 | Lee | H04L 5/14 |
| 2017/0086172 A1* | 3/2017 | Dinan | H04W 72/0453 |
| 2017/0215080 A1* | 7/2017 | Zhang | H04L 5/001 |
| 2017/0332267 A1* | 11/2017 | Kim | H04L 5/00 |
| 2017/0366318 A1 | 12/2017 | Narasimha et al. | |
| 2018/0192344 A1* | 7/2018 | Feng | H04W 72/042 |
| 2018/0263002 A1* | 9/2018 | Hu | H04L 5/001 |
| 2018/0270851 A1* | 9/2018 | Bhattad | H04W 72/1294 |
| 2019/0207667 A1* | 7/2019 | Zhou | H04L 1/0057 |
| 2019/0230696 A1* | 7/2019 | Kim | H04L 5/0053 |
| 2020/0059844 A1* | 2/2020 | Lee | H04W 36/30 |
| 2020/0220693 A1* | 7/2020 | Babaei | H04L 1/1812 |
| 2020/0260486 A1* | 8/2020 | Zhou | H04W 28/0278 |
| 2020/0280960 A1* | 9/2020 | Liu | H04W 48/10 |

FOREIGN PATENT DOCUMENTS

| | | | | |
|---|---|---|---|---|
| CN | 105228199 A | 1/2016 | | |
| EP | 3044892 B1 | 9/2014 | | |
| EP | 3 044 892 B1 * | 11/2014 | | H04J 11/00 |
| WO | 2017164780 A1 | 9/2017 | | |
| WO | 2017180045 A1 | 10/2017 | | |

OTHER PUBLICATIONS

Supplementary European Search Report dated Feb. 4, 2022 for Patent Application No. EP18929682, consisting of 10-pages.

* cited by examiner

METHOD AND APPARATUS FOR OPERATIONS IN DIFFERENT FREQUENCY BANDS WITHIN A RADIO DEVICE

This application is a 35 U.S.C. § 371 national phase filing of International Application No. PCT/CN2018/099553, filed Aug. 9, 2018, the disclosure of which is incorporated herein by reference in its entirety.

FIELD OF THE INVENTION

The present disclosure generally relates to communication networks, and more specifically, to method and apparatus for operations in different frequency bands within a radio device.

BACKGROUND

This section introduces aspects that may facilitate a better understanding of the disclosure. Accordingly, the statements of this section are to be read in this light and are not to be understood as admissions about what is in the prior art or what is not in the prior art.

Mobile broadband may continue to drive some demands for big overall traffic capacity and huge achievable end-user data rates in a wireless communication network. Many scenarios for network services in the future may require data rates of up to 10 Gbps in local areas. These demands for very high system capacity and end-user data rates can be met by networks where distances between access nodes may range from a few meters in indoor deployments up to roughly 50 meters in outdoor deployments, for example, by next generation communication networks with an infrastructure density considerably higher than the densest networks of today. Besides the traditional licensed exclusive spectrum, the next generation communication systems such as fifth generation (5G) and new radio (NR) systems are also expected to be operable on the unlicensed band which may be sharable. It may be possible for a network operator to own a certain amount of licensed carriers while it could use some unlicensed carriers. Thus, it is desirable to arrange operations in different frequency bands such as licensed and unlicensed bands within a radio device efficiently.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Multi-antenna technology brings significant improvements in system performance and energy efficiency by focusing the transmission and reception of signal energy into certain spatial regions. In a wireless communication network such as 4.5G/5G or NR, radio devices are expected to operate with multiple antennas to obtain large beamforming gains. When the multi-antenna technology is employed in a radio device which is able to support operations in licensed and unlicensed carriers, there may be a need to configure the operations sharing between licensed and unlicensed carriers adaptively.

The present disclosure proposes a solution of operation configurations in different frequency bands within a radio device, which may enable the radio device to be shared between licensed and unlicensed carriers adaptively while mitigating an impact of emission from the adjacent frequency carrier, so as to improve transmission capacity and energy efficiency of the radio device.

According to a first aspect of the present disclosure, there is provided a method implemented at a radio device which is operable in a first carrier and a second carrier. The method comprises determining whether the operation in the first carrier is to interfere with the operation in the second carrier. The method further comprises arranging the operation in at least one of the first carrier and the second carrier based at least in part on the determination.

In accordance with some exemplary embodiments, the determination of whether the operation in the first carrier is to interfere with the operation in the second carrier may comprise: checking data transmission in the first carrier, and determining that the operation in the first carrier is to interfere with the operation in the second carrier, in response that the data transmission in the first carrier is to interfere with detection of availability of the second carrier.

In accordance with some exemplary embodiments, the arrangement of the operation in the at least one of the first carrier and the second carrier based at least in part on the determination may comprise: detecting availability of the second carrier by reducing at least part of interference from the first carrier, in response to the determination that the operation in the first carrier is to interfere with the operation in the second carrier.

In accordance with some exemplary embodiments, the at least part of interference from the first carrier may be reduced by cancelling at least part of intermodulation distortion from the first carrier.

Alternatively or additionally, the at least part of interference from the first carrier may be reduced by enabling data transmission in at least one of the first carrier and the second carrier to be scheduled adaptively.

Alternatively or additionally, the at least part of interference from the first carrier may be reduced by enabling the availability of the second carrier to be detected in a specified direction.

In accordance with some exemplary embodiments, the radio device may comprise a base station. In this case, enabling the data transmission in at least one of the first carrier and the second carrier to be scheduled adaptively may comprise: scheduling no data transmission in the first carrier by the base station during detecting the availability of the second carrier.

In accordance with an exemplary embodiment where the radio device is operated as a base station, the method according to the first aspect of the present disclosure may further comprise keeping the first carrier to be in an idle status at least during transmission of at least one of synchronization signal and system information in the second carrier.

In accordance with some exemplary embodiments, the radio device may comprise a terminal device. In this case, enabling the data transmission in at least one of the first carrier and the second carrier to be scheduled adaptively may comprise: sending a request to a base station to reschedule the data transmission in at least one of the first carrier and the second carrier, so as to enable the first carrier to be in an idle status during detecting the availability of the second carrier by the terminal device.

In accordance with an exemplary embodiment where the radio device is operated as a terminal device, the method according to the first aspect of the present disclosure may further comprise: preventing data from being transmitted in the second carrier until receiving a response to the request from the base station. The received response may indicate the data transmission rescheduled in at least one of the first carrier and the second carrier. Optionally, the method according to the first aspect of the present disclosure may further comprise: performing data transmission in the second carrier according to the received response.

In accordance with some exemplary embodiments, the first carrier may comprise a licensed carrier and the second carrier may comprise an unlicensed carrier.

According to a second aspect of the present disclosure, there is provided an apparatus. The apparatus may comprise one or more processors and one or more memories comprising computer program codes. The one or more memories and the computer program codes may be configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus. The apparatus may comprise a determining unit and an arranging unit. In accordance with some exemplary embodiments, the determining unit may be operable to carry out at least the determining step of the method according to the first aspect of the present disclosure. The arranging unit may be operable to carry out at least the arranging step of the method according to the first aspect of the present disclosure.

According to a ninth aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the method according to the first aspect of the present disclosure.

According to a tenth aspect of the present disclosure, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the method according to the first aspect of the present disclosure.

According to an eleventh aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the method according to the first aspect of the present disclosure.

According to a twelfth aspect of the present disclosure, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the method according to the first aspect of the present disclosure.

According to a thirteenth aspect of the present disclosure, there is provided a method implemented in a communication system which may include a host computer, a base station and a UE. The method may comprise, at the host computer, receiving user data transmitted to the base station from the UE which may perform any step of the method according to the first aspect of the present disclosure.

According to a fourteenth aspect of the present disclosure, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the method according to the first aspect of the present disclosure.

According to a fifteenth aspect of the present disclosure, there is provided a method implemented in a communication system which may include a host computer, a base station and a UE. The method may comprise, at the host computer, receiving, from the base station, user data originating from a transmission which the base station has received from the UE. The base station may perform any step of the method according to the first aspect of the present disclosure.

According to a sixteenth aspect of the present disclosure, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the method according to the first aspect of the present disclosure.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1A:
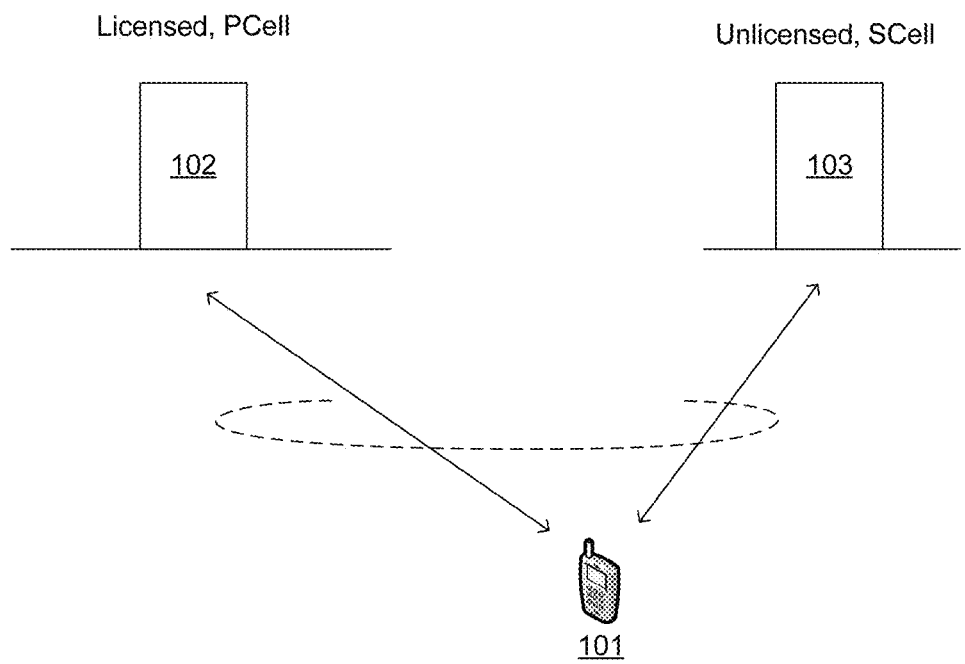
FIG. 1A is a diagram illustrating an example of licensed-assisted access (LAA) according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Wireless communication networks are widely deployed to provide various telecommunication services such as voice, video, data, messaging and broadcasts. To meet dramatically increasing network requirements on traffic capacity and data rates, one interesting option for communication technique development is to allow a wireless communication network such as a NR or 5G system to be operable on the unlicensed band, besides the licensed band. By aggregation of licensed and unlicensed carriers, a radio device can benefit from the additional transmission capacity provided by the unlicensed band.

However, regulatory requirements may not permit transmissions in the unlicensed band without performing some type of channel sensing. For example, since the unlicensed band is generally shared with other radios of similar or dissimilar wireless technologies, a listen-before-talk (LBT) procedure may need to be applied by a radio device before transmitting on a channel that uses the unlicensed band. The LBT procedure requires the radio device to perform a clear channel assessment to determine if the channel is available. Regulatory requirements, for example, in Europe, specify an energy detection threshold such that if the radio device receives energy greater than this threshold, the radio device assumes that the channel is not available for immediate use. The LBT procedure is vital for fair coexistence of an unlicensed system with other operators and technologies operating in the unlicensed band, such as Wi-Fi and licensed-assisted access (LAA).

FIG. 1A is a diagram illustrating an example of LAA according to an embodiment of the present disclosure. The LAA framework may be built on the carrier aggregation solutions for an LTE network to access the additional bandwidth in the unlicensed band. For simplicity, FIG. 1A only depicts some exemplary elements such as a UE 101, a primary cell (PCell) 102, and a secondary cell (SCell) 103. It could be appreciated that LAA technology also may be applicable to other suitable network scenarios in which different numbers of network elements or devices may be involved.

As illustrated in FIG. 1A, the LTE network can configure the UE 101 to aggregate additional SCells (such as the SCell 103) using frequency carriers in the unlicensed band. The PCell 102 may retain the exchange of essential control messages and can provide always-available robust spectrum for real-time or high-value traffics. The PCell 102 also can provide mobility handling and management for the UE 101 via the high-quality licensed band in an LTE radio access network with wide coverage. The aggregated SCells in the unlicensed band, when available, may be utilized as a bandwidth booster to serve, for example, best effort traffics. The SCell 103 in the LAA network may mainly operate in downlink-only (DL-only) mode. According to some exemplary embodiments, 3.5 GHz band and/or 5 GHz band may be used as the operation band for the LAA network.

A wireless communication network such as NR or 5G which can be operable on the licensed and unlicensed bands may employ the multi-antenna technology to obtain more performance gain. Through the use of a large number of service antennas which are operated fully coherently and adaptively, the multi-antenna technology such as massive multiple-input multiple-output (MIMO) can bring prominent improvements in data throughput and energy efficiency, particularly when MIMO is combined with simultaneous scheduling of a large number of user terminals (e.g., tens or hundreds).

In general, MIMO can be used for the time division duplex (TDD) operation, but it also may be potentially applied in the frequency division duplex (FDD) operation. Many benefits may be achieved by applying MIMO in a wireless communication network, for example, large data throughput, the extensive use of inexpensive low-power components, reduced latency, simplification of the media access control (MAC) layer, and robustness to interference and intentional jamming. The anticipated throughput of the massive MIMO may depend on the propagation environment providing asymptotically orthogonal channels to the terminals.

In accordance with some exemplary embodiments, a single radio device with multiple antennas or RF chains may be able to support combined operations on the licensed and unlicensed bands according to different configurations. The capacity of hardware (for example, analog-to-digital converter/digital-to-analog converter (ADC/DAC), mixer, transistors and/or the like) used for the radio device may be improved. According to an exemplary embodiment, the licensed and unlicensed operations can be implemented in a single radio chain including transmitter and receiver (TX/RX) which can cover an ultra-wide frequency range. Optionally, the licensed and unlicensed operations also can be implemented in different radio frequency (RF) chains.

Figure 1B:
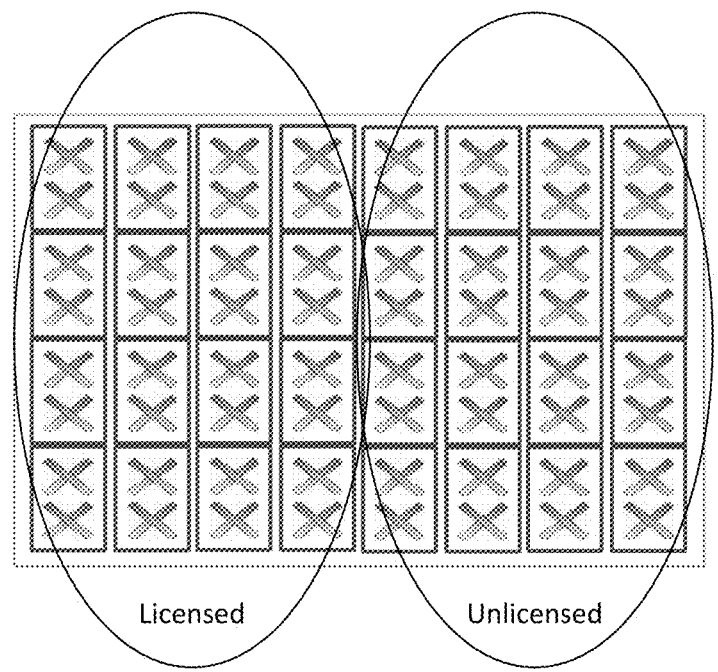
FIG. 1B is a diagram illustrating an exemplary multi-antenna configuration according to an embodiment of the present disclosure.

FIG. 1B is a diagram illustrating an exemplary multi-antenna configuration according to an embodiment of the present disclosure. The example shown in FIG. 1B may correspond to an active antenna system (AAS) radio with 64 antennas. For digital beamforming, 64 RF chains may be used where each antenna is connected to one RF chain. According to the exemplary embodiment, the licensed and unlicensed operations can be implemented in different RF chains within a single radio. For example, the left 32 branches can be implemented with the licensed operation, and the right 32 branches can be implemented with the unlicensed operation, as shown in FIG. 1B. It will be appreciated that the multi-antenna configuration shown in FIG. 1B is just as an example, and in practice the AAS radio may be configured with more or less antennas suitable to support the licensed and unlicensed operations in MIMO communications.

Figure 2:
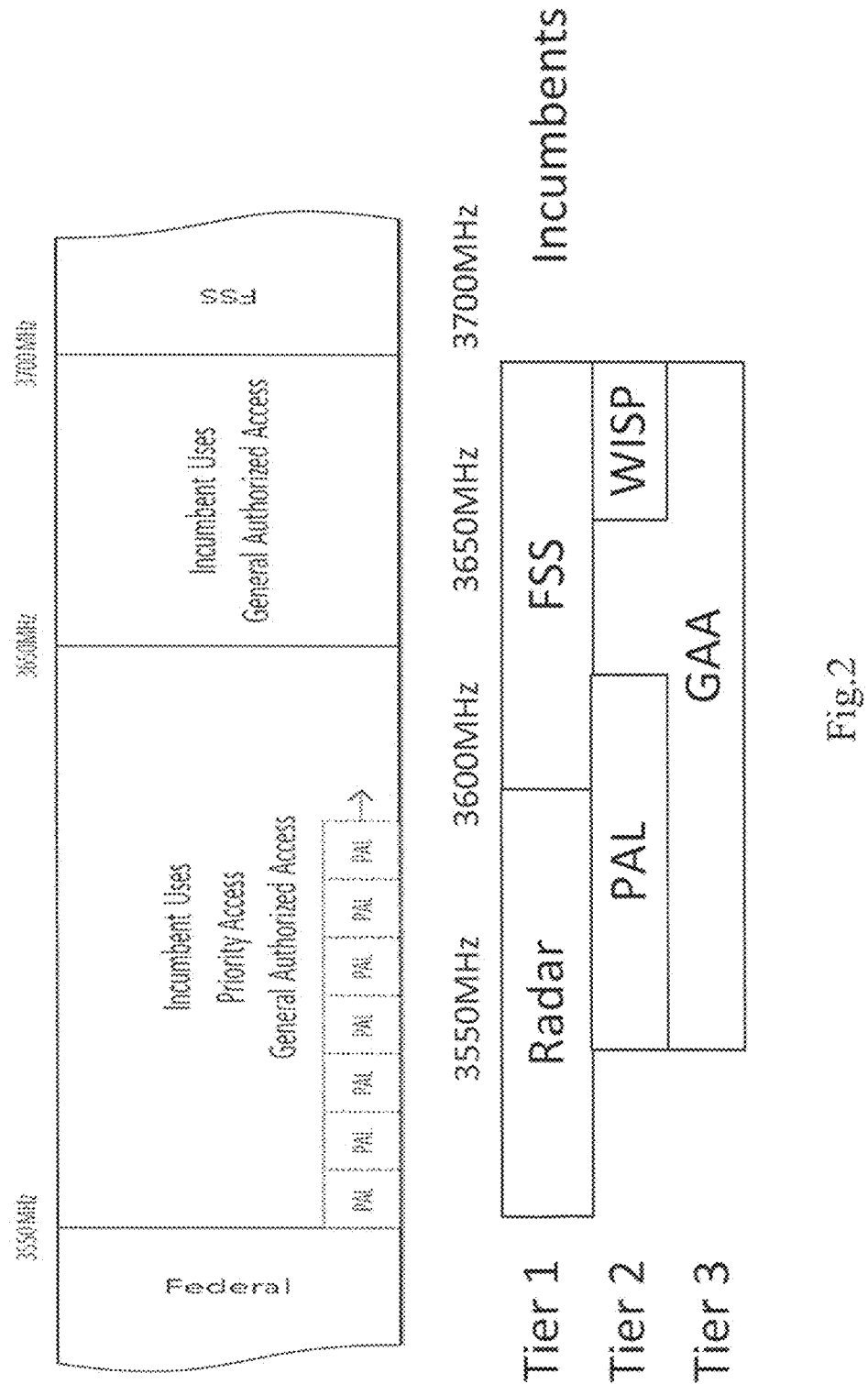
FIG. 2 is a diagram illustrating an exemplary communication band according to an embodiment of the present disclosure.

FIG. 2 is a diagram illustrating an exemplary communication band according to an embodiment of the present disclosure. The embodiment shown in FIG. 2 illustrates the use of 3.5 GHz band which may be a candidate band for licensed and/or unlicensed communications. It will be appreciated that there may be other candidate bands for licensed and/or unlicensed communications, such as 5 GHz, 37 GHz, 60 GHz, etc. FIG. 2 only shows some exemplary band operations for communication services, and other appropriate band operations also may be applied according to regulatory requirements.

As shown in FIG. 2, incumbents for Tier 1 band may comprise military radar and fixed satellite service (FSS). Communications in Tier 1 may be protected by the federal communications commission (FCC) from interferences from Tier 2 and Tier 3. A part of Tier 2 band may be used for priority access licenses (PAL) and wireless Internet service providers (WISP) services. In addition, general authorized access (GAA) communications can be supported by Tier 3 band and another part of Tier 2 band. The communications in Tier 1 band may have a higher priority than the communications in Tier 2 band, while the communications in Tier 3 band may have a lower priority than those in Tier 2 band. For example, communications in Tier 2 may be protected from interferences from Tier 3 and have no interference on Tier 1. Communications in Tier 3 may not be protected and will not interfere with Tier 1 or the protected Tier 2.

In accordance with an exemplary embodiment, some mobile communication systems may be operated in Tier 2 band as the licensed band or Tier 3 band as the unlicensed band. In general, there may be an equivalent isotropic radiated power (EIRP) limit for the communications in the unlicensed band. Similarly, an EIRP limit also may be taken into account in the licensed band, although its influence in the licensed band is not as significant as in the unlicensed band.

Considering an exemplary scenario, a network operator may own certain amount of Tier 2 licensed band (e.g., 3550-3590 MHz) while it could use other band such as Tier 3 unlicensed band (e.g., 3600-3640 MHz). With improvement of hardware capacity, a radio device with multiple antennas and RF chains can operate in the licensed and unlicensed bands which are implemented in the same chain or in different chains separately. When the radio device is shared between adjacent licensed and unlicensed carriers, the operation in the unlicensed carrier may be impacted by emission from the adjacent licensed carrier.

Figure 3:
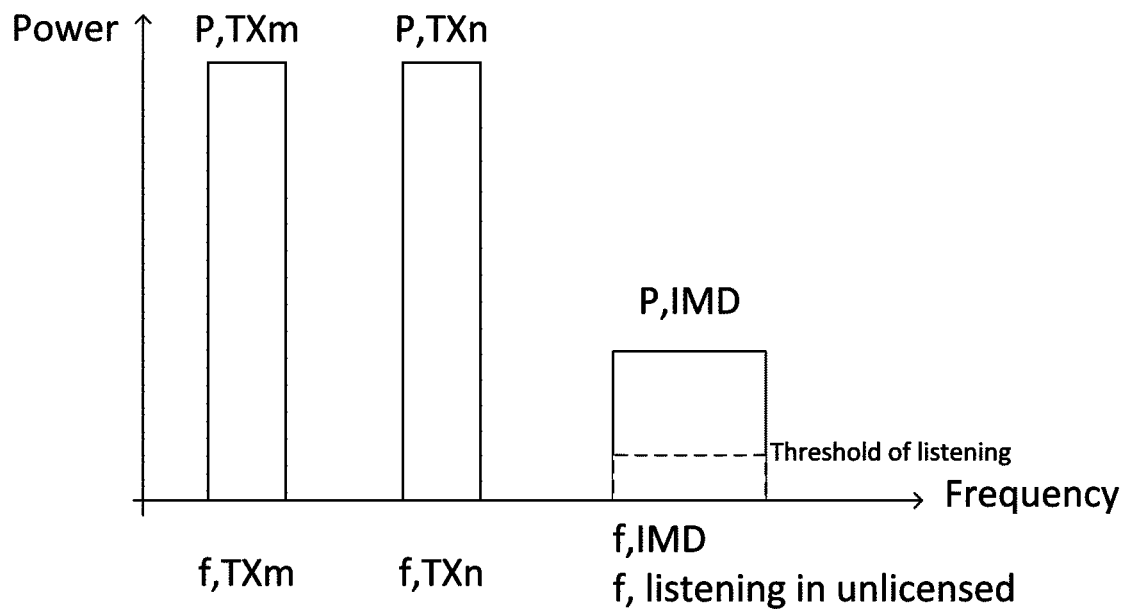
FIG. 3 is a diagram illustrating an example of intermodulation distortion (IMD) according to an embodiment of the present disclosure.

FIG. 3 is a diagram illustrating an example of intermodulation distortion (IMD) according to an embodiment of the present disclosure. The embodiment shown in FIG. 3 illustrates the simplified correspondence between frequency and power. For example, FIG. 3 shows transmission power P,TXm and P,TXn corresponding to carriers in frequencies f,TXm and f,TXn, respectively. According to the exemplary embodiment, the intermodulation product (which is indicated by "f,IMD" in FIG. 3) of carrier in f,TXm and carrier in f,TXn (where indices m and n may have the same or different values) is the same as the unlicensed frequency (which is indicated by "f, listening in unlicensed" in FIG. 3). In this case, the listening performed for the unlicensed frequency to check channel availability is almost impossible, because the IMD falls into the listening receiver through leakage between radio branches or antennas, and the IMD power (which is denoted as P,IMD in FIG. 3) is higher than the threshold of listening.

From the spectrum point of view, combining operations in different frequency bands within a single radio device can enhance spectrum efficiency. However, the emission from a licensed carrier may interfere with an LBT procedure (or simply listening) performed in an adjacent unlicensed carrier. If so, the data transmission in the licensed carrier without LBT will block the transmission in the adjacent unlicensed carrier where the LBT procedure is needed before the transmission. Thus, it may be desirable to introduce an effective solution to configure or arrange operations of the radio device in the licensed and unlicensed bands adaptively.

In the proposed solution according to some exemplary embodiments, a radio device (such as a base station or a terminal device) may be operable in at least two frequency bands (such as licensed and unlicensed bands) simultaneously with multiple antennas or RF chains. According to some exemplary embodiments, the proposed solution can arrange operation of the radio device in at least one frequency band adaptive to interferences between different frequency bands. In this way, the flexibility of operations in different frequency bands may be increased, and the system performance such as capacity and/or throughput may be improved.

It is noted that some embodiments of the present disclosure are mainly described in relation to 5G or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Figure 4:
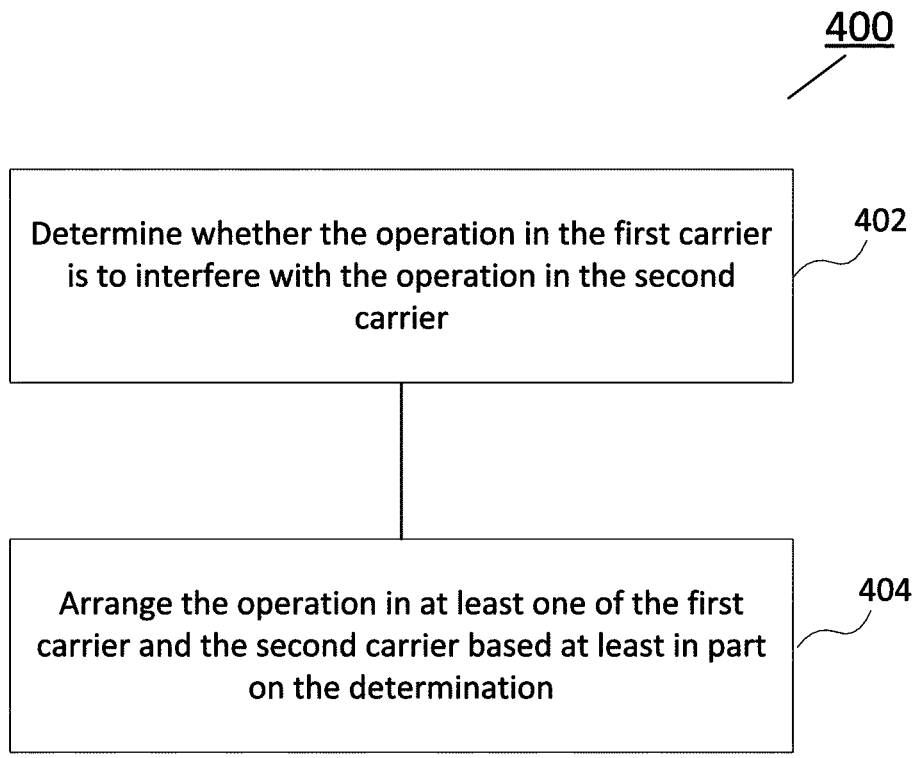
FIG. 4 is a flowchart illustrating a method according to some embodiments of the present disclosure.

FIG. 4 is a flowchart illustrating a method 400 according to some embodiments of the present disclosure. The method 400 illustrated in FIG. 4 may be performed by an apparatus implemented in a radio device or communicatively coupled to a radio device. In accordance with an exemplary embodiment, the radio device may comprise a base station such as eNB or gNB. Alternatively, the radio device may comprise a terminal device such as UE. The radio device may be equipped with multiple antennas to apply MIMO technology. Radio resources in different frequency bands such as licensed and unlicensed bands may be utilized by the radio device to support communications in a wireless communication network.

According to the exemplary method 400 illustrated in FIG. 4, the radio device which is operable in a first carrier and a second carrier can determine whether the operation in the first carrier is to interfere with the operation in the second carrier, as shown in block 402. In accordance with some exemplary embodiments, the first carrier and the second carrier may refer to carriers in different types of frequency bands for wireless communications. According to an exemplary embodiment, the first carrier may comprise a licensed carrier and the second carrier may comprise an unlicensed carrier.

In accordance with some exemplary embodiments, in order to determine whether the operation in the first carrier is to interfere with the operation in the second carrier, the radio device can check data transmission in the first carrier. For example, the radio device may check the power emitted from the first carrier to the second carrier. If the emission power of the first carrier is higher than a threshold specified for an LBT procedure in the second carrier, the radio device can determine that the data transmission in the first carrier is to interfere with detection of availability of the second carrier. Alternatively, the radio device may check the status of data scheduling in the first carrier. If there is a potential conflict between the data scheduling in the first carrier and an LBT procedure to be performed in the second carrier, the radio device can determine that the data transmission in the first carrier is to interfere with detection of availability of the second carrier.

In response to determining that the data transmission in the first carrier is to interfere with the availability detection of the second carrier, the radio device can determine that the operation in the first carrier is to interfere with the operation in the second carrier. It can be appreciated that other suitable parameters, conditions and/or events also may be considered by the radio device to determine whether there may be interferences between operations in the first carrier and the second carrier.

Based at least in part on the determination made in block 402, the radio device can arrange the operation in at least one of the first carrier and the second carrier, as shown in block 404. For example, the radio device may decide to operate in either or both of the first and second carriers according to the interference between the two carriers. The arrangement of the operation may be performed by adjusting one or more current operations and/or applying one or more new operations in at least one of the first carrier and the second carrier. In the case that there is no interference between the two carriers or the interference can be ignored, the radio device may select to make no additional processing of the interference.

In accordance with some exemplary embodiments, the arrangement of the operation in block 404 may comprise detecting availability of the second carrier by reducing at least part of interference from the first carrier, in response to the determination that the operation in the first carrier is to interfere with the operation in the second carrier. For example, the availability of the second carrier may be detected by performing an LBT procedure in the second carrier. An example of the operation in the first carrier interfering with the operation in the second carrier is that the emission from the first carrier makes the LBT procedure in the second carrier impossible. In order to implement the availability detection for the second carrier and the corresponding data transmission, the radio device needs to mitigate the emission from the first carrier.

In accordance with some exemplary embodiments, there are many possible techniques for mitigating the emission from the first carrier to the second carrier, for example, including but not limited to IMD cancellation, adaptive scheduling, and directional detection. The radio device can use any combination of these techniques to reduce at least part of interference from the first carrier to the second carrier. Specifically, the radio device may cancel at least part of IMD from the first carrier, enable data transmission in at least one of the first carrier and the second carrier to be scheduled adaptively, and/or enable the availability of the second carrier to be detected in a specified direction.

In the case that the IMD cancellation technique is used for emission mitigation, the IMD falling into the listening receiver can be cancelled, for example, based on a certain cancellation principle. According to an exemplary embodiment, the radio device can cancel the IMD in the listening receiver baseband when performing the listening, for example, by using a training cancellation model based on a training process. Alternatively or additionally, the radio device can use the directional detection technique according to an IMD radiation pattern.

Figure 5:
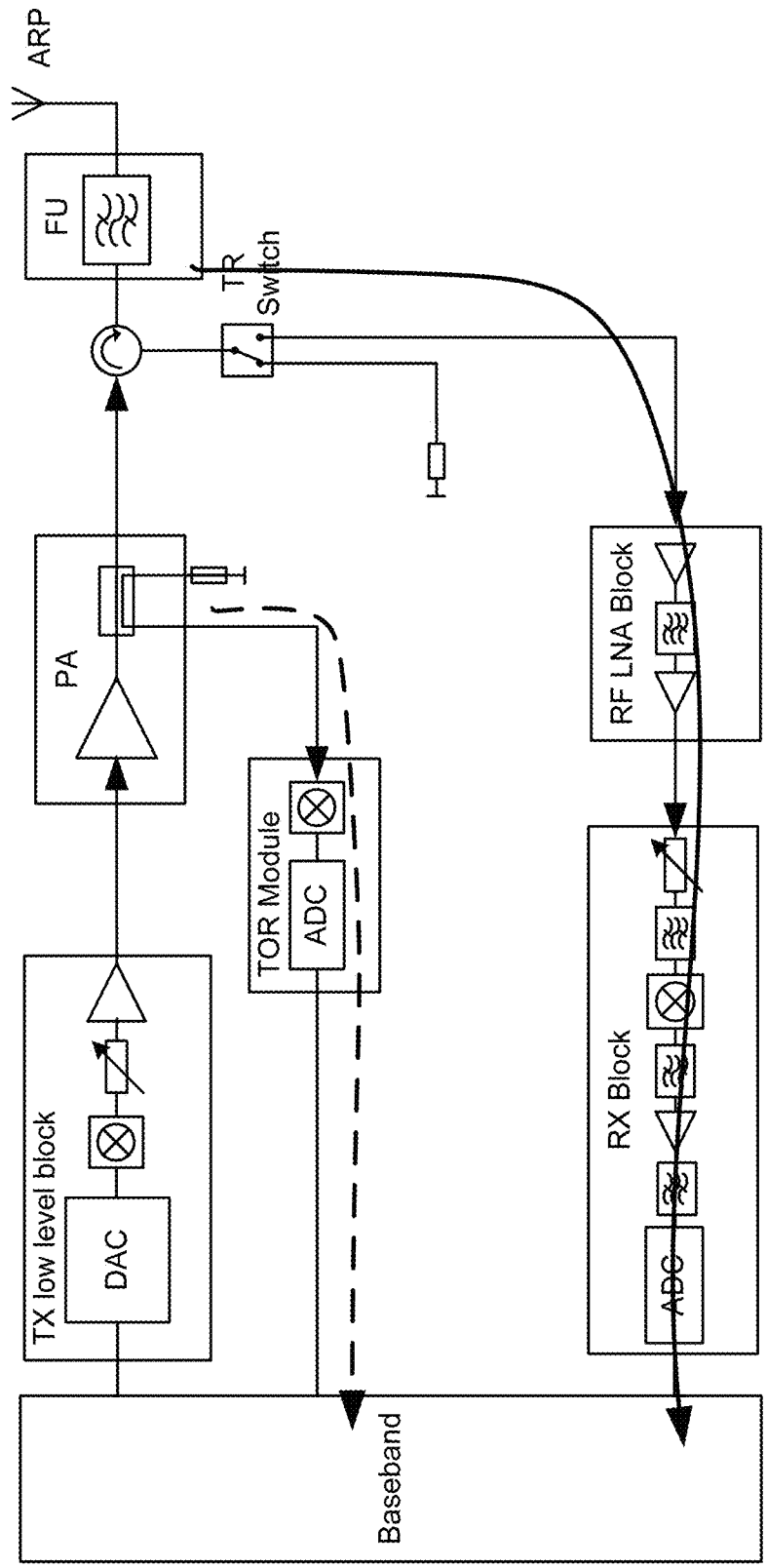
FIG. 5 is a diagram illustrating an example of directional detection according to some embodiments of the present disclosure.

FIG. 5 is a diagram illustrating an example of directional detection according to some embodiments of the present disclosure. The diagram in FIG. 5 may represent the typical baseband and TX/RX structure in a radio device which can support directional detection. The term "directional detection" mentioned here may refer to performing channel listening/sensing in a specified direction to detect availability of a channel. For simplicity, FIG. 5 only depicts some exemplary components such as a baseband, a TX low level block, a power amplifier (PA), a filter unit (FU), an antenna reference point (ARP), a transmitter receiver (TR) switch, a RF low noise amplifier (LNA) block, a RX block and a transmitter observation receiver (TOR) module. It will be appreciated that the structure and components shown in FIG. 5 are just as examples, and more or less alternative components and connections may be deployed in the same or different structure of the exemplary implementation.

In the embodiment where directional detection is supported, for example, in high gain beamforming case, the radio device can perform the listening on the transmission of another radio device with null direction of IMD. The IMD radiation pattern can be gotten by implementing a suitable solution in the radio baseband to get a draft IMD. According to an exemplary embodiment, the TOR module and the RX block as shown in FIG. 5 can be assumed to have the same phase interface. For example, the phase change between the TOR module and the RX block can be minimized by hardware or compensated by calibration. In this case, the TOR module can receive an output signal from the TX block through the PA (as denoted by the dotted arrow in FIG. 5), and the IMD can be extracted. Through matrix calculation based on the IMD from all transmitter branches, the IMD radiation pattern can be obtained. According to the IMD radiation pattern, the directional detection can be performed through the RX block (as denoted by the solid arrow in FIG. 5) with null direction of IMD. The directional detection can avoid the high-power radiation direction based on reciprocity property.

In the case that the adaptive scheduling technique is used for emission mitigation, the radio device may adjust transmission configurations for at least one of the first carrier and the second carrier as required. In an exemplary embodiment where the radio device is operated as a base station, enabling the data transmission in at least one of the first carrier and the second carrier to be scheduled adaptively may comprise scheduling no data transmission in the first carrier by the base station during detecting the availability of the second carrier. For example, the data transmission in the first carrier may be set to an idle status when the base station performs the listening in the second carrier. Specifically, the base station may implement signaling between baseband processing parts for the two carriers. When the base station has a chance to start a LBT procedure for the second carrier, a request may be sent to the baseband processing part for the first carrier to schedule or define an empty time slot. Once the empty time slot is defined, the feedback signaling may be return to the baseband processing part for the second carrier to synchronize up the empty time slot. Then the defined time slot may be used to run the LBT procedure for the second carrier.

Optionally, the base station may keep the first carrier to be in an idle status at least during transmission of at least one of synchronization signal and system information in the second carrier. According to an exemplary embodiment, the base station such as eNB/gNB needs to guarantee that the subframe/slot in a licensed carrier is empty before transmission of synchronization signal and/or system information in an unlicensed carrier. In this way, the key transmission in the unlicensed carrier can be guaranteed for normal operations.

In an exemplary embodiment where the radio device is operated as a terminal device, enabling the data transmission in at least one of the first carrier and the second carrier to be scheduled adaptively may comprise sending a request to a base station to reschedule the data transmission in at least one of the first carrier and the second carrier, so as to enable the first carrier to be in an idle status during detecting the availability of the second carrier by the terminal device. Optionally, the terminal device may prevent data from being transmitted in the second carrier until receiving a response to the request from the base station. The received response may indicate the data transmission rescheduled in at least one of the first carrier and the second carrier. The terminal device can perform data transmission in the second carrier according to the received response. In this way, the terminal device such as UE can request its serving base station such as eNB/gNB to perform smart scheduling of UL data transmissions in licensed and unlicensed carriers, so that no emission from the licensed carrier impacts the LBT procedure for the unlicensed carrier.

Figure 6A:
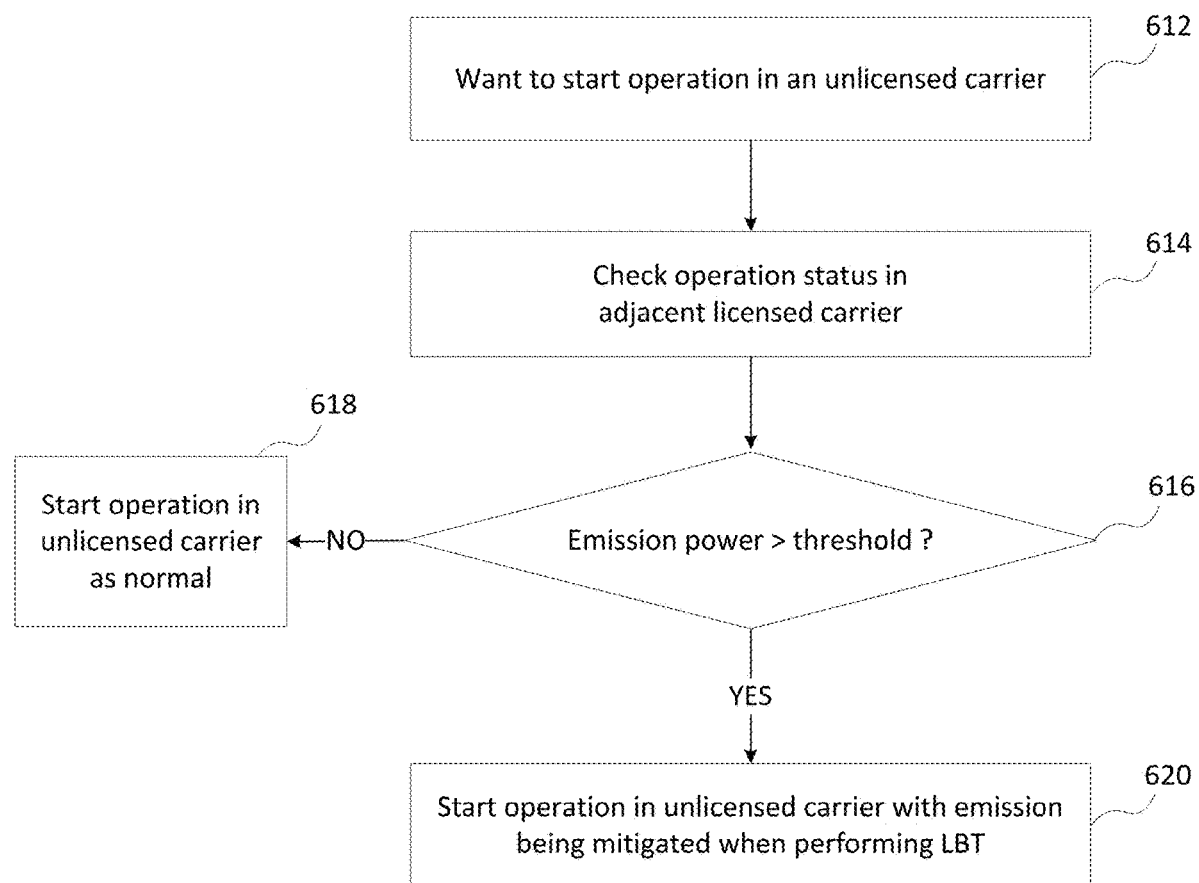
FIG. 6A is a flowchart illustrating an exemplary operation configuration procedure according to some embodiments of the present disclosure.

FIG. 6A is a flowchart illustrating an exemplary operation configuration procedure according to some embodiments of the present disclosure. The exemplary operation configuration procedure illustrated in FIG. 6A may be performed by a base station such as eNB/gNB which can support MIMO operations in licensed and unlicensed bands. According to the exemplary procedure shown in FIG. 6A, the base station can make adaptive operation configurations of the licensed and unlicensed bands, for example, according to the method as described in connection with FIG. 4.

According to the procedure shown in FIG. 6A, the eNB/gNB which is operating in a licensed carrier may want to start operation in an unlicensed carrier, as shown in block 612. The licensed carrier is adjacent to the unlicensed carrier within the same radio. The eNB/gNB can check an operation status in the adjacent licensed carrier, as shown in block 614. If the emission power from the adjacent licensed carrier to the unlicensed carrier is not higher than a certain threshold (i.e., "NO" branch of block 616), the eNB/gNB can start operation in the unlicensed carrier as normal, as shown in block 618.

In accordance with an exemplary embodiment, the threshold in block 616 may be a threshold predefined for an LBT procedure performed in the unlicensed carrier. In the case that the emission power from the adjacent licensed carrier to the unlicensed carrier is not higher than this threshold, the eNB/gNB can perform the operation in the unlicensed carrier without an impact of the emission from the licensed carrier. Accordingly, there is no need to change the current configuration of operation in the licensed carrier.

Alternatively, if the emission power from the adjacent licensed carrier to the unlicensed carrier is higher than the certain threshold (i.e., "YES" branch of block 616), the eNB/gNB can start operation in the unlicensed carrier with emission being mitigated when performing the LBT procedure, as shown in block 620. For example, the emission can be mitigated by applying one or more emission mitigation techniques as described in connection with FIG. 4, including but not limited to IMD cancellation, adaptive scheduling and/or directional detection.

In accordance with an exemplary embodiment, synchronization signal and/or system information may be periodically transmitted by the eNB/gNB in the unlicensed carrier. In order to guarantee that the synchronization signal and/or system information in the unlicensed carrier could be transmitted successfully, the eNB/gNB may decide not to schedule data transmission in the licensed carrier during the transmission of synchronization signal and/or system information in the unlicensed carrier.

Figure 6B:
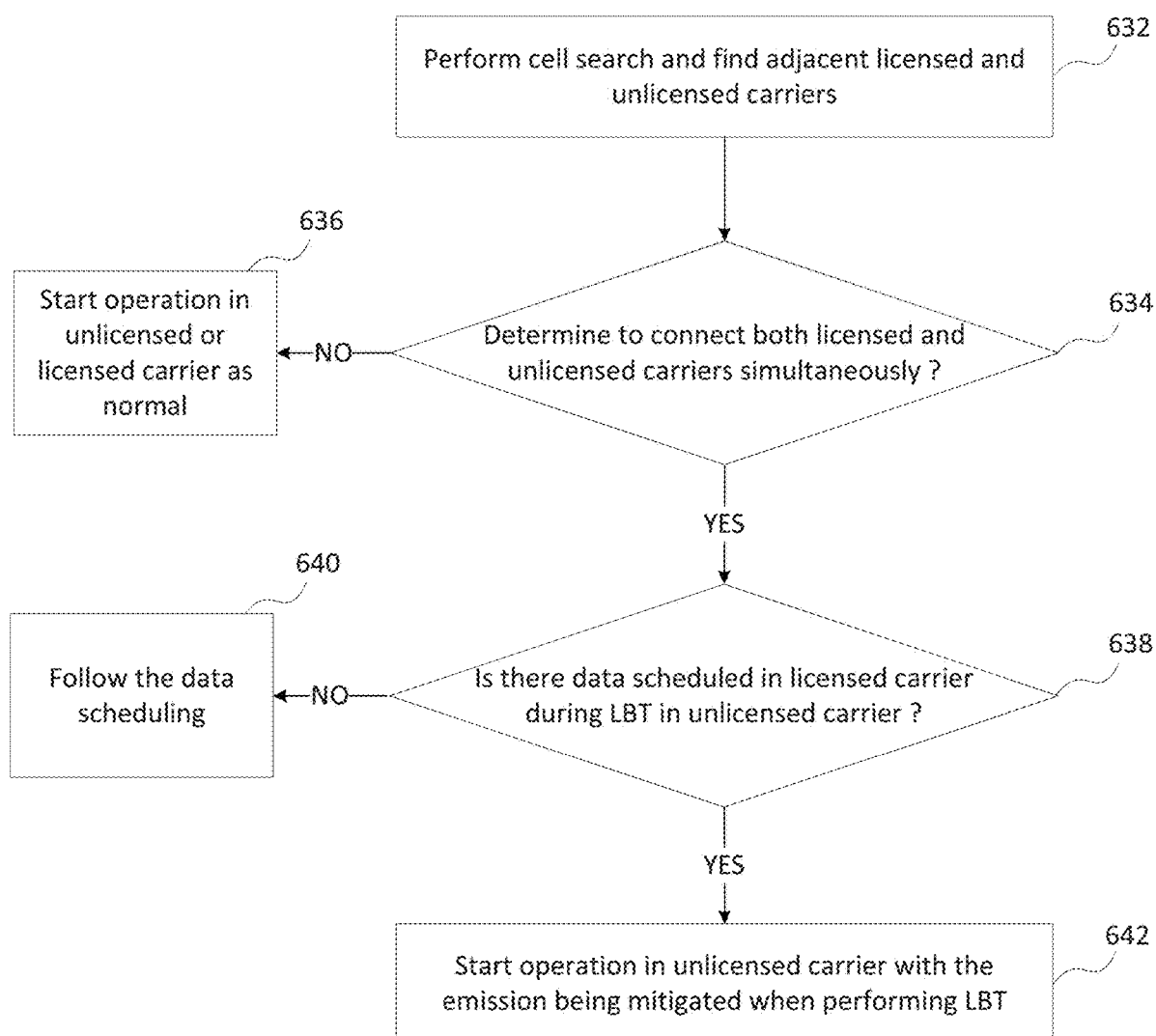
FIG. 6B is a flowchart illustrating another exemplary operation configuration procedure according to some embodiments of the present disclosure.

FIG. 6B is a flowchart illustrating another exemplary operation configuration procedure according to some embodiments of the present disclosure. The exemplary operation configuration procedure illustrated in FIG. 6B may be performed by a terminal device such as UE which can support MIMO operations in licensed and unlicensed bands. According to the exemplary procedure shown in FIG. 6B, the terminal device can make adaptive operation configurations of the licensed and unlicensed bands, for example, according to the method as described in connection with FIG. 4.

According to the procedure shown in FIG. 6B, the UE may perform cell search and find adjacent licensed and unlicensed carriers within the same radio, as shown in block 632. The UE can determine whether to connect both licensed and unlicensed carriers simultaneously, as shown in block 634. The determination may be made by the UE, for example, according to UL data transmission requirement and device capability. In the case that the UE determine to connect only one of the licensed and unlicensed carriers (i.e., "NO" branch of block 634), the UE can start operation in the unlicensed carrier or the licensed carrier as normal, as shown in block 636.

Alternatively, if the amount of UL data is large, the UE may determine to connect both licensed and unlicensed carriers simultaneously (i.e., "YES" branch of block 634), for example, via dual cell/carrier aggregation (DC/CA). Then the UE may check the UL data scheduling status for both licensed and unlicensed carriers. If there is no data scheduled in the licensed carrier during an LBT procedure for data scheduled in the unlicensed carrier (i.e., "NO" branch of block 638), the UE can follow the data scheduling without interference from the licensed carrier to the unlicensed carrier, as shown in block 640.

In the case that there is data scheduled in the licensed carrier during the LBT procedure for the data scheduled in the unlicensed carrier (i.e., "YES" branch of block 638), the UE may start operation in the unlicensed carrier with the emission from the licensed carrier being mitigated when performing the LBT procedure for the unlicensed carrier, as shown in block 642. For example, the emission can be mitigated by applying one or more emission mitigation techniques as described in connection with FIG. 4, including but not limited to IMD cancellation, adaptive scheduling and/or directional detection.

Figure 7A:
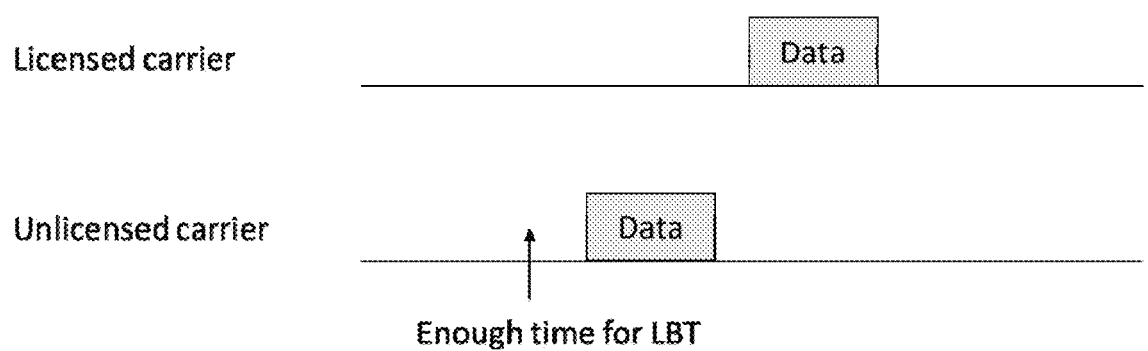
FIGS. 7A-7B are diagrams illustrating exemplary data scheduling according to some embodiments of the present disclosure.
Figure 7B:
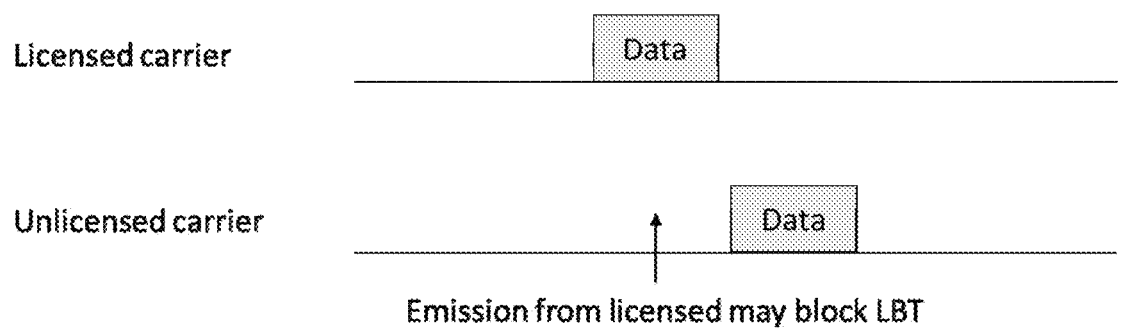

FIGS. 7A-7B are diagrams illustrating exemplary data scheduling according to some embodiments of the present disclosure. The data scheduling shown in FIGS. 7A-7B may be configured for UL transmissions of a UE in licensed and unlicensed carriers by an eNB/gNB. The configurations of data scheduling shown in FIGS. 7A-7B are just as examples. It will be appreciated that other suitable scheduling configurations also may be applicable to the UE which can support combined operations in licensed and unlicensed bands.

According to the exemplary data scheduling shown in FIG. 7A, UL data transmission of the UE in the licensed carrier is in an idle status during scheduling of UL data transmission of the UE in the unlicensed carrier. Thus the data transmission scheduled in the licensed carrier has no impact on a LBT procedure for the scheduled data transmission in the unlicensed carrier. Accordingly, the UE can follow the configured UL data transmissions in the licensed and unlicensed carriers without any change of the data scheduling.

According to the exemplary data scheduling shown in FIG. 7B, UL data transmission in the licensed carrier is scheduled during the UE performs a LBT procedure for UL data transmission to be scheduled in the unlicensed carrier. In this case, emission from the licensed carrier may block the LBT procedure in the unlicensed carrier. Thus, the UE may need to adjust operation in at least one of the licensed and unlicensed carriers, so as to mitigate the impact of emission from the licensed carrier on the LBT procedure to be performed in the unlicensed carrier.

The proposed solution according to one or more exemplary embodiments can be applied to a radio device which is able to support operations in licensed and unlicensed bands simultaneously with multiple antennas and RF chains. Taking the advantage of the proposed adaptive configuration mechanism for operations in adjacent licensed and unlicensed carriers makes it possible to mitigate the impact of emission from the licensed carrier to the unlicensed carrier.

In this way, radio resources may be efficiently utilized at the eNb/gNB side and/or the UE side to improve the total system capacity, and the bottleneck of licensed and unlicensed operations in single radio realization can be solved accordingly.

The various blocks shown in FIG. 4 and FIGS. 6A-6B may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 8A:
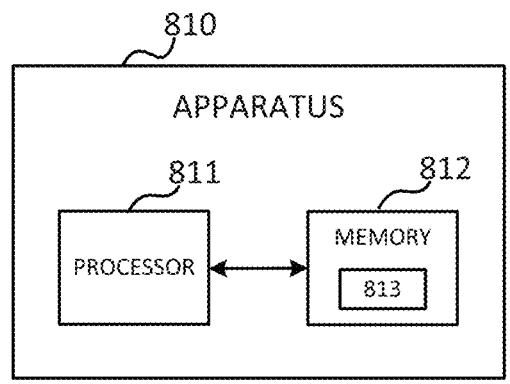
FIG. 8A is a block diagram illustrating an apparatus according to some embodiments of the present disclosure.

FIG. 8A is a block diagram illustrating an apparatus 810 according to various embodiments of the present disclosure. As shown in FIG. 8A, the apparatus 810 may comprise one or more processors such as processor 811 and one or more memories such as memory 812 storing computer program codes 813. The memory 812 may be non-transitory machine/processor/computer readable storage medium. In accordance with some exemplary embodiments, the apparatus 810 may be implemented as an integrated circuit chip or module that can be plugged or installed into a radio device as described with respect to FIG. 4.

In some implementations, the one or more memories 812 and the computer program codes 813 may be configured to, with the one or more processors 811, cause the apparatus 810 at least to perform any operation of the method as described in connection with FIG. 4. Alternatively or additionally, the one or more memories 812 and the computer program codes 813 may be configured to, with the one or more processors 811, cause the apparatus 810 at least to perform more or less operations to implement the proposed methods according to the exemplary embodiments of the present disclosure.

Figure 8B:
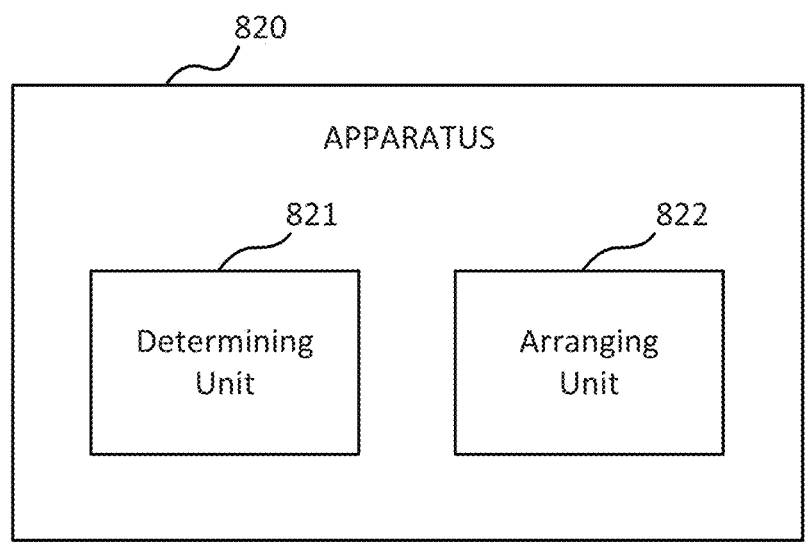
FIG. 8B is a block diagram illustrating another apparatus according to some embodiments of the present disclosure.

FIG. 8B is a block diagram illustrating an apparatus 820 according to some embodiments of the present disclosure. As shown in FIG. 8B, the apparatus 820 may comprise a determining unit 821 and an arranging unit 822. In some exemplary embodiments, the apparatus 820 may be implemented in a radio device such as eNB/gNB. In other exemplary embodiments, the apparatus 820 may be implemented in a radio device such as UE. The determining unit 821 may be operable to carry out the operation in block 402, and the arranging unit 822 may be operable to carry out the operation in block 404. Optionally, the determining unit 821 and/or the arranging unit 822 may be operable to carry out more or less operations to implement the proposed methods according to the exemplary embodiments of the present disclosure.

Figure 9:
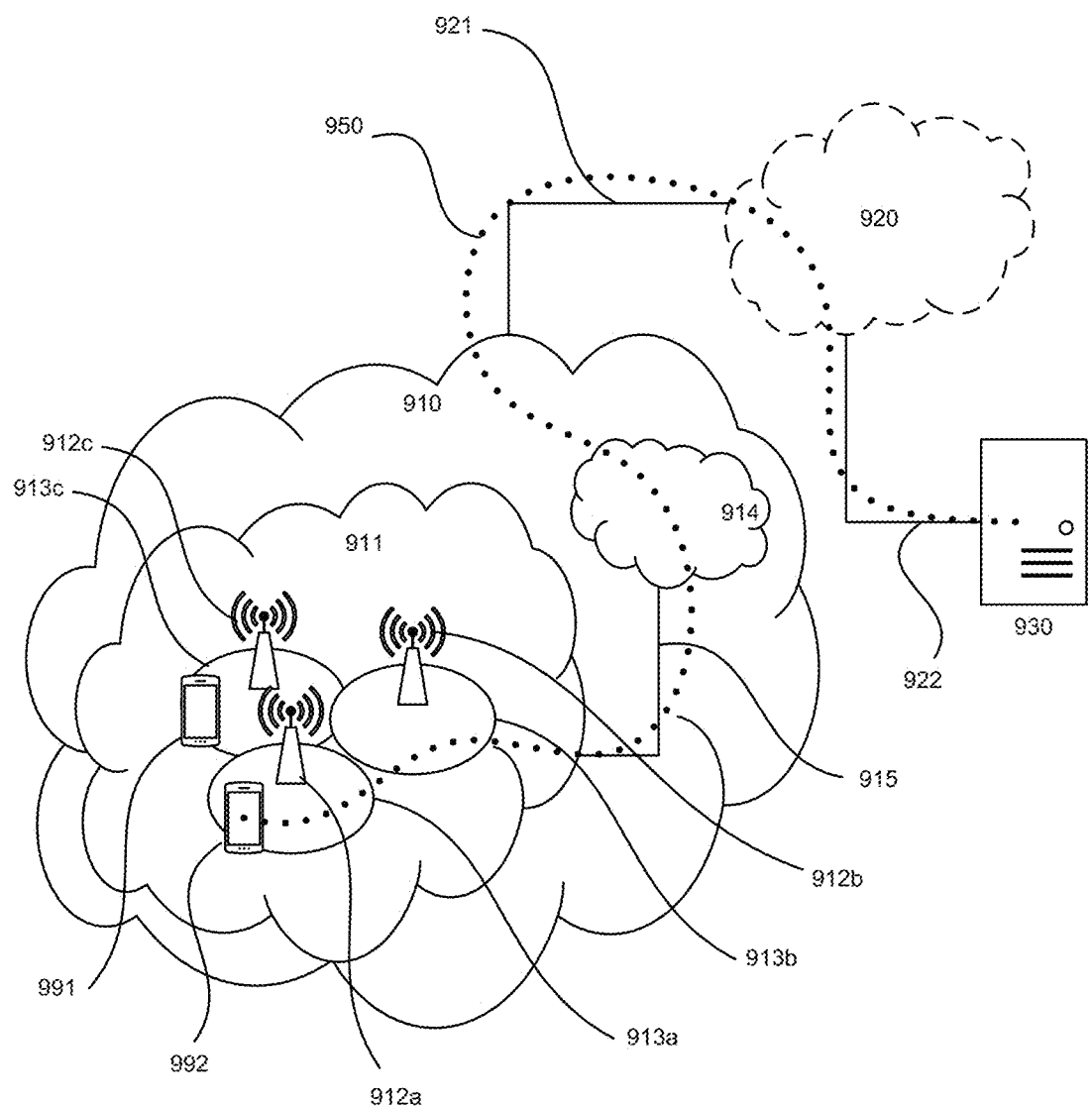
FIG. 9 is a block diagram illustrating a telecommunication network connected via an intermediate network to a host computer in accordance with some embodiments of the present disclosure.

FIG. 9 is a block diagram illustrating a telecommunication network connected via an intermediate network to a host computer in accordance with some embodiments of the present disclosure.

With reference to FIG. 9, in accordance with an embodiment, a communication system includes a telecommunication network 910, such as a 3GPP-type cellular network, which comprises an access network 911, such as a radio access network, and a core network 914. The access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to the core network 914 over a wired or wireless connection 915. A first UE 991 located in a coverage area 913c is configured to wirelessly connect to, or be paged by, the corresponding base station 912c. A second UE 992 in a coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. Connections 921 and 922 between the telecommunication network 910 and the host computer 930 may extend directly from the core network 914 to the host computer 930 or may go via an optional intermediate network 920. An intermediate network 920 may be one of or a combination of more than one of a public, private or hosted network; the intermediate network 920, if any, may be a backbone network or the Internet; in particular, the intermediate network 920 may comprise two or more sub-networks (not shown).

The communication system of FIG. 9 as a whole enables connectivity between the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, the base station 912 may not or need not be informed about the past routing of an incoming downlink communication with data originating from the host computer 930 to be forwarded (e.g., handed over) to a connected UE 991. Similarly, the base station 912 need not be aware of the future routing of an outgoing uplink communication originating from the UE 991 towards the host computer 930.

Figure 10:
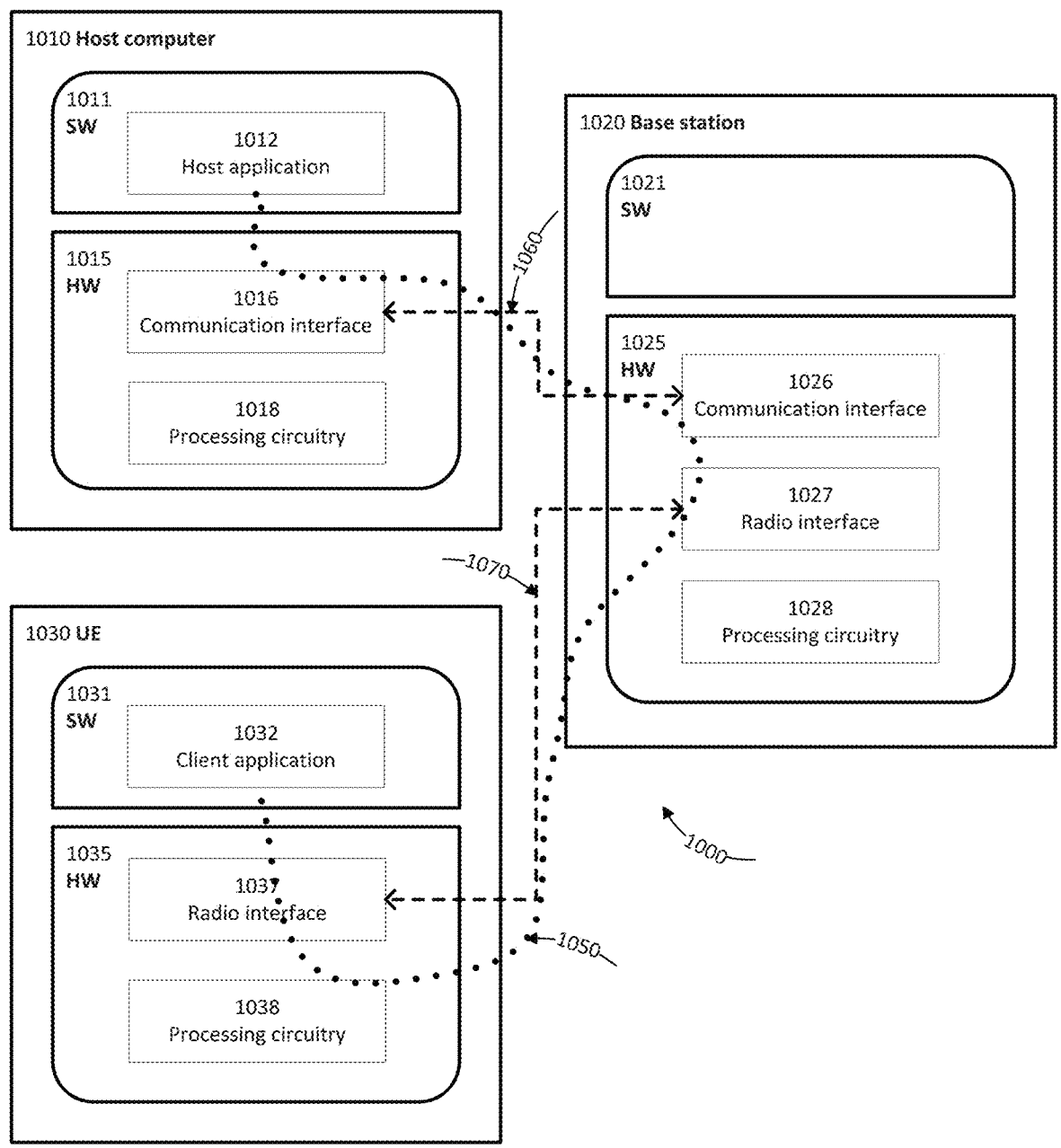
FIG. 10 is a block diagram illustrating a host computer communicating via a base station with a UE over a partially wireless connection in accordance with some embodiments of the present disclosure.

FIG. 10 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises a processing circuitry 1018, which may have storage and/or processing capabilities. In particular, the processing circuitry 1018 may comprise one or more programmable processors, application-specific integrated circuits, field programmable gate arrays or combinations of these (not shown)

adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with the UE 1030 located in a coverage area (not shown in FIG. 10) served by the base station 1020. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 1020 further includes a processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes a processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

It is noted that the host computer 1010, the base station 1020 and the UE 1030 illustrated in FIG. 10 may be similar or identical to the host computer 930, one of base stations 912*a*, 912*b*, 912*c* and one of UEs 991, 992 of FIG. 9, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the UE 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

Wireless connection 1070 between the UE 1030 and the base station 1020 is in accordance with the teachings of the embodiments described throughout this disclosure. One or more of the various embodiments improve the performance of OTT services provided to the UE 1030 using the OTT connection 1050, in which the wireless connection 1070 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 1050 between the host computer 1010 and the UE 1030, in response to variations in the measurement results. The measurement procedure and/or the network functionality for reconfiguring the OTT connection 1050 may be implemented in software 1011 and hardware 1015 of the host computer 1010 or in software 1031 and hardware 1035 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which the software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer 1010's measurements of throughput, propagation times, latency and the like. The measurements may be implemented in that the software 1011 and 1031 causes messages to be transmitted, in particular empty or 'dummy' messages, using the OTT connection 1050 while it monitors propagation times, errors etc.

Figure 11:
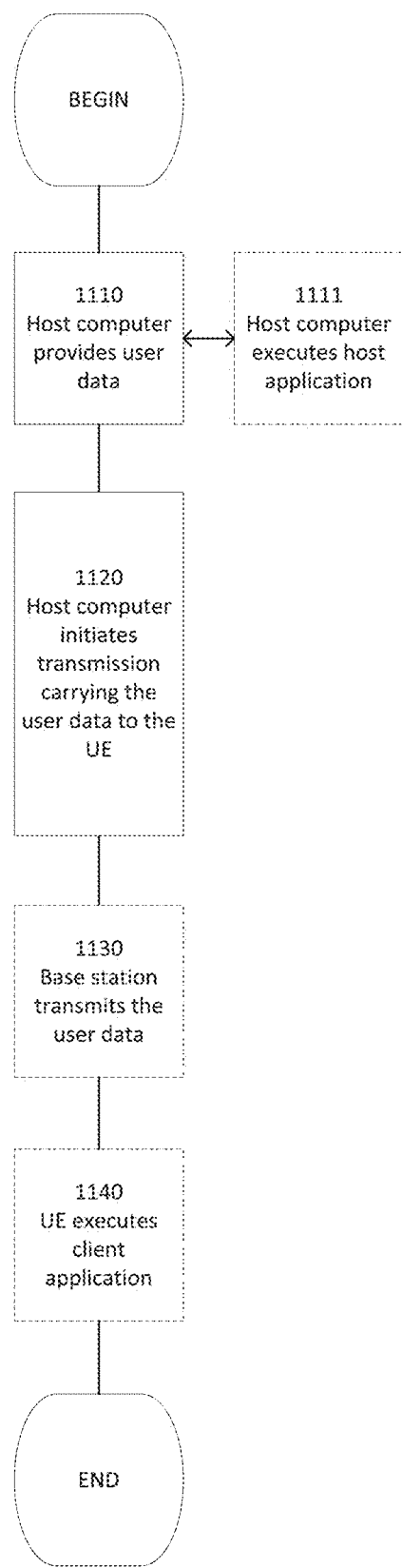
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
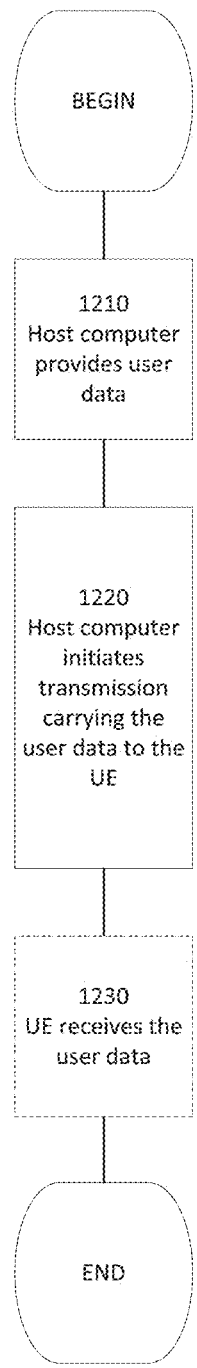
FIG. 12 is a flowchart illustrating a method implemented in a communication system, in accordance with an embodiment of the present disclosure.

FIG. 12 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
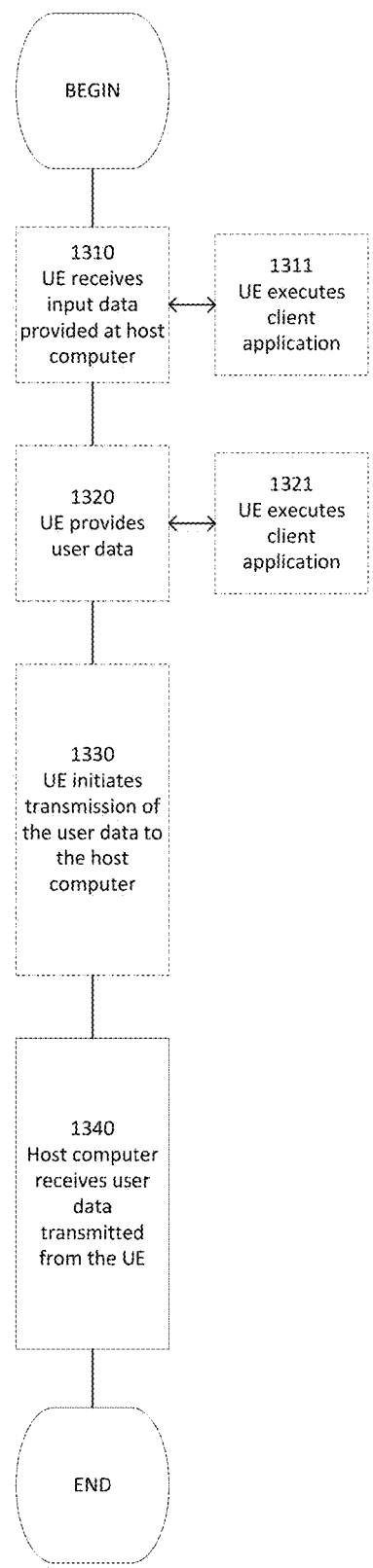
FIG. 13 is a flowchart illustrating a method implemented in a communication system, in accordance with an embodiment of the present disclosure.

FIG. 13 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
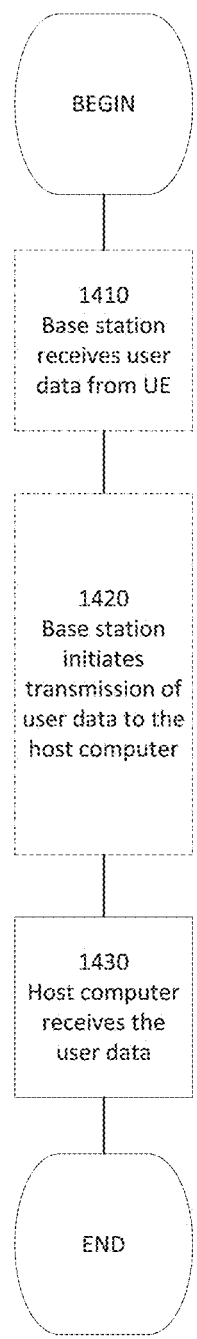
FIG. 14 is a flowchart illustrating a method implemented in a communication system, in accordance with an embodiment of the present disclosure.

FIG. 14 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method implemented at a radio device which is operable in a first carrier and a second carrier, comprising:
    determining whether an operation in the first carrier is to interfere with an operation in the second carrier, the determining being based on an emission power from the first carrier to the second carrier and a threshold; and
    arranging the operation in at least one of the first carrier and the second carrier, based at least in part on the determination.

2. The method according to claim 1, wherein the determination of whether the operation in the first carrier is to interfere with the operation in the second carrier comprises:
    checking data transmission in the first carrier; and
    determining that the operation in the first carrier is to interfere with the operation in the second carrier, in response that the data transmission in the first carrier is to interfere with detection of availability of the second carrier.

3. The method according to claim 1, wherein the arrangement of the operation in the at least one of the first carrier and the second carrier based at least in part on the determination comprises:
    detecting availability of the second carrier by reducing at least part of interference from the first carrier, in response to the determination that the operation in the first carrier is to interfere with the operation in the second carrier.

4. The method according to claim 3, wherein the at least part of interference from the first carrier is reduced by at least one of the following:
    cancelling at least part of intermodulation distortion from the first carrier;
    enabling data transmission in at least one of the first carrier and the second carrier to be scheduled adaptively; and
    enabling the availability of the second carrier to be detected in a specified direction.

5. The method according to claim 4, wherein the radio device comprises a base station.

6. The method according to claim 5, wherein enabling the data transmission in at least one of the first carrier and the second carrier to be scheduled adaptively comprises:
    scheduling no data transmission in the first carrier by the base station during detecting the availability of the second carrier.

7. The method according to claim 5, further comprising:
    keeping the first carrier to be in an idle status at least during transmission of at least one of synchronization signal and system information in the second carrier.

8. The method according to claim 4, wherein the radio device comprises a terminal device.

9. The method according to claim 8, wherein enabling the data transmission in at least one of the first carrier and the second carrier to be scheduled adaptively comprises:
    sending a request to a base station to reschedule the data transmission in at least one of the first carrier and the second carrier, so as to enable the first carrier to be in an idle status during detecting the availability of the second carrier by the terminal device.

10. The method according to claim 9, further comprising:
    preventing data from being transmitted in the second carrier until receiving a response to the request from the base station; and
    performing data transmission in the second carrier according to the received response which indicates the data transmission rescheduled in at least one of the first carrier and the second carrier.

11. The method according to claim 1, wherein the first carrier comprises a licensed carrier and the second carrier comprises an unlicensed carrier.

12. An apparatus implemented in a radio device which is operable in a first carrier and a second carrier, comprising:
    one or more processors; and
    one or more memories comprising computer program codes,
    the one or more memories and the computer program codes configured to, with the one or more processors, cause the apparatus at least to:
        determine whether an operation in the first carrier is to interfere with an operation in the second carrier, the determining being based on an emission power from the first carrier to the second carrier and a threshold; and
        arrange the operation in at least one of the first carrier and the second carrier based at least in part on the determination.

13. The apparatus according to claim 12, wherein to determine whether the operation in the first carrier is to interfere with the operation in the second carrier comprises:
    checking data transmission in the first carrier; and
    determining that the operation in the first carrier is to interfere with the operation in the second carrier, in response that the data transmission in the first carrier is to interfere with detection of availability of the second carrier.

14. The apparatus according to claim 12, wherein to arrange the operation in the at least one of the first carrier and the second carrier based at least in part on the determination comprises:
    detecting availability of the second carrier by reducing at least part of interference from the first carrier, in response to the determination that the operation in the first carrier is to interfere with the operation in the second carrier.

15. The apparatus according to claim 14, wherein the at least part of interference from the first carrier is reduced by at least one of the following:
    cancelling at least part of intermodulation distortion from the first carrier;
    enabling data transmission in at least one of the first carrier and the second carrier to be scheduled adaptively; and
    enabling the availability of the second carrier to be detected in a specified direction.

16. The apparatus according to claim 15, wherein enabling the data transmission in at least one of the first carrier and the second carrier to be scheduled adaptively comprises:
    scheduling no data transmission in the first carrier by the base station during detecting the availability of the second carrier.

17. The apparatus according to claim 15, wherein enabling the data transmission in at least one of the first carrier and the second carrier to be scheduled adaptively comprises:
    keeping the first carrier to be in an idle status at least during transmission of at least one of synchronization signal and system information in the second carrier.

18. The apparatus according to claim 15, wherein enabling the data transmission in at least one of the first carrier and the second carrier to be scheduled adaptively comprises:
    sending a request to a base station to reschedule the data transmission in at least one of the first carrier and the second carrier, so as to enable the first carrier to be in an idle status during detecting the availability of the second carrier by the terminal device.

19. The apparatus according to claim 18, wherein the computer program codes are further configured to, with the one or more processors, cause the apparatus to:
    prevent data from being transmitted in the second carrier until receiving a response to the request from the base station; and
    perform data transmission in the second carrier according to the received response which indicates the data transmission rescheduled in at least one of the first carrier and the second carrier.

20. A non-transitory computer-readable storage medium comprising a computer program product including instructions to cause at least one processor to:
   determine whether an operation in a first carrier is to interfere with an operation in a second carrier, the determining being based on an emission power from the first carrier to the second carrier and a threshold; and
   arrange the operation in at least one of the first carrier and the second carrier, based at least in part on the determination.

* * * * *